(12) United States Patent
Moyer

(10) Patent No.: US 6,971,618 B2
(45) Date of Patent: Dec. 6, 2005

(54) SIMPLIFIED ARTICULATING CUP HOLDER

(75) Inventor: Scott A. Moyer, Auburn Hills, MI (US)

(73) Assignee: Lear Corporation, Southfield, MI (US)

( * ) Notice: Subject to any disclaimer, the term of this patent is extended or adjusted under 35 U.S.C. 154(b) by 160 days.

(21) Appl. No.: 10/604,050

(22) Filed: Jun. 24, 2003

(65) Prior Publication Data

US 2004/0262480 A1 Dec. 30, 2004

(51) Int. Cl.$^7$ .............................................. A47K 1/08
(52) U.S. Cl. .................................................. 248/311.2
(58) Field of Search .................... 248/311.2, 311.3, 248/312.1, 313, 312; 296/37.12; 224/926, 224/281, 282

(56) References Cited

U.S. PATENT DOCUMENTS

| | | | |
|---|---|---|---|
| 5,330,146 A | 7/1994 | Spykerman | 248/311.2 |
| 5,704,579 A | 1/1998 | Celentino et al. | 248/311.2 |
| 5,762,307 A | 6/1998 | Patmore | 248/311.2 |
| 5,988,579 A | 11/1999 | Moner, Jr. et al. | 248/311.2 |
| 6,361,008 B1 | 3/2002 | Gravenstreter | 248/311.2 |
| 6,550,736 B2 | 4/2003 | Schaal | 248/311.2 |

*Primary Examiner*—Anita King
*Assistant Examiner*—Amy J. Sterling
(74) *Attorney, Agent, or Firm*—Bill C Panagos

(57) ABSTRACT

The present invention provides for a cup holder assembly in which pivotal movement of the cupholder articulating arms is elastically inhibited by an over-molded TPE to sufficiently to facilitate infinite adjustment of the cupholder arms between fully extended and fully retracted positions for supporting containers of various sizes, without the need for spring or ratchet mechanism or a separate hinge for the arm to pivot, thereby providing reduced assembly and lowering the number of parts necessary.

12 Claims, 3 Drawing Sheets

SIMPLIFIED ARTICULATING CUP HOLDER

BACKGROUND OF INVENTION

1. Field of the Invention

The present invention generally relates to a vehicle cupholder assembly, and more particularly to a vehicle cupholder assembly having a one piece cupholder articulating arm unit.

2. Description of the Related Art

The prior art includes a variety of cupholders or container holders which are used for supporting cups, cans, or other beverage containers in vehicles which are selectively accessible to the vehicle passengers or occupants.

Some such cupholder devices include adjustability features for holding containers of various sizes. However, such adjustable cupholders generally require a number of components be assembled to provide this adjustability. In addition, some so these devises have distinct incremental adjustment of the cupholder arms which may not be sufficient to hold containers of certain sizes because it may not provide a snug fit for holding the container. Several of these prior art cupholders also requires that the cupholder arms be manually collapsed fully before they can be adjusted outward to receive a larger container. This may be inconvenient or awkward for a vehicle occupant, particularly the driver.

For example, U.S. Pat. No. 5,330,146 issued Jul. 19, 1994 to Spykerman teaches an articulating cup holder utilizing multiple parts and pivot pins to achieve the articulating function.

U.S. Pat. No. 5,704,579 issued Jan. 6, 1998 to Celentino et al teaches the use of multiple magnets to hold a drink container in a cup holder.

U.S. Pat. No. 5,762,307 issued Jun. 9, 1998 to Patmore teaches a cup holder using multiple pieces and pivot pins to allow articulation.

U.S. Pat. No. 5,988,579 issued Nov. 23, 1999 to Monér Jr. et al teaches the use of multiple parts, springs, and pivot pins to allow articulation of the cup holder arms as well as a tactile material to help grip the beverage container.

U.S. Pat. No. 6,361,008 issued Mar. 26, 2002 to Gravenstreter teaches multiple cup holder arm parts and springs and pivot pins.

U.S. Pat. No. 6,550,736 issued Apr. 22, 2003 to Schaal teaches a pivoting fan-like type beverage container holder.

U.S. patent application Publication No. 2002/0171018 published Nov. 21, 2002 to Harada teaches the use of pivoting arms to hold a beverage container in a cup holder.

Accordingly, it is desirable to provide a collapsible vehicle cupholder structure which is infinitely adjustable for firmly securing containers of various sizes, and which does not require the assembly of a plurality of parts to form the cupholder arm units.

DISCLOSURE OF THE INVENTION

The present invention provides advantages and alternatives over the prior art by providing a cupholder assembly in which the articulating arm unit is molded as a complete unit including living hinges, articulating arms and articulating arm unit body.

According to a further aspect of the present invention there is provided a cup holder assembly in which pivotal movement of the cupholder articulating arms is elastically inhibited sufficiently to facilitate infinite adjustment of the cupholder arms between fully extended and fully retracted positions for supporting containers of various sizes, without the need for spring or ratchet mechanism or a separate hinge for the arm to pivot, thereby providing reduced assembly and lowering the number of parts necessary.

Preferably, a cupholder assembly adapted for use in a vehicle for supporting containers, the vehicle having a receiving aperture for receiving the cupholder assembly, the cupholder assembly comprising: a cupholder housing adapted for use in a vehicle and having an opening on one end adapted to accept; a cupholder tray adapted for slidable connection within said cupholder housing between storage and use positions; and a cupholder infinitely adjustable articulated arm unit adapted for permanent mounting on said cupholder tray, said cupholder infinitely adjustable articulated arm unit comprising; a body portion adapted for permanent mounting on said cupholder tray and further adapted to hold beverage containers, at least one articulating arm adapted to hold beverage containers and pivotal about and connected to said body portion by, a living hinge; and said cupholder infinitely adjustable articulated arm unit being molded with the at least one living hinged articulating arm in a normally closed position and further molded of a first plastic composition and over-molded of a second plastic capable of providing a spring-like closing action to said at least one living hinged articulating arm when it is pivoted out of said normally closed position.

In another preferred embodiment, a cupholder assembly adapted for use in a vehicle for supporting containers, the vehicle having a receiving aperture for receiving the cupholder assembly, the cupholder assembly comprising: a cupholder housing adapted for use in a vehicle and having an opening on one end adapted to accept; a cupholder tray adapted for slidable connection within said cupholder housing between storage and use positions; and a cupholder infinitely adjustable articulated arm unit adapted for permanent mounting on said cupholder tray, said cupholder infinitely adjustable articulated arm unit comprising; a body portion adapted for permanent mounting on said cupholder tray and further adapted to hold beverage containers, two articulating arms each adapted to hold a beverage container and each pivotal about and connected to said body portion by, a living hinge; and said cupholder infinitely adjustable articulated arm unit being molded with the two living hinged articulating arms in a normally closed position and further molded of a first plastic composition and over-molded of a second plastic capable of providing a spring-like closing action to said two living hinged articulating arms when they are pivoted out of said normally closed position.

According to yet another aspect of the present invention is to provide a vehicle cupholder assembly in which the cupholder arms are infinitely adjustable between fully extended and fully retracted positions for grasping containers of various sizes.

According to a yet further aspect of the present invention there is provided a vehicle cupholder assembly in which the cupholder arms are sufficiently elastically inhibited from pivotal movement to enable infinite adjustment of the cupholder arms for grasping containers of various sizes.

According to still another aspect of the present invention there is provided a cupholder assembly in which the cupholder arms do not require complete collapse prior to adjustment for receiving a larger container.

According to still yet another aspect of the present invention there is provided a cupholder assembly which does not require separate hinge pins and tensioning parts to provide for articulating arms and arm movement.

The present invention thus advantageously provides a cupholder assembly which is easy and inexpensive to assembly and which reduces the number of parts and assembly processes necessary to provide for an infinitely adjustable articulated arm cupholder.

DETAILED DESCRIPTION

Figure 1:
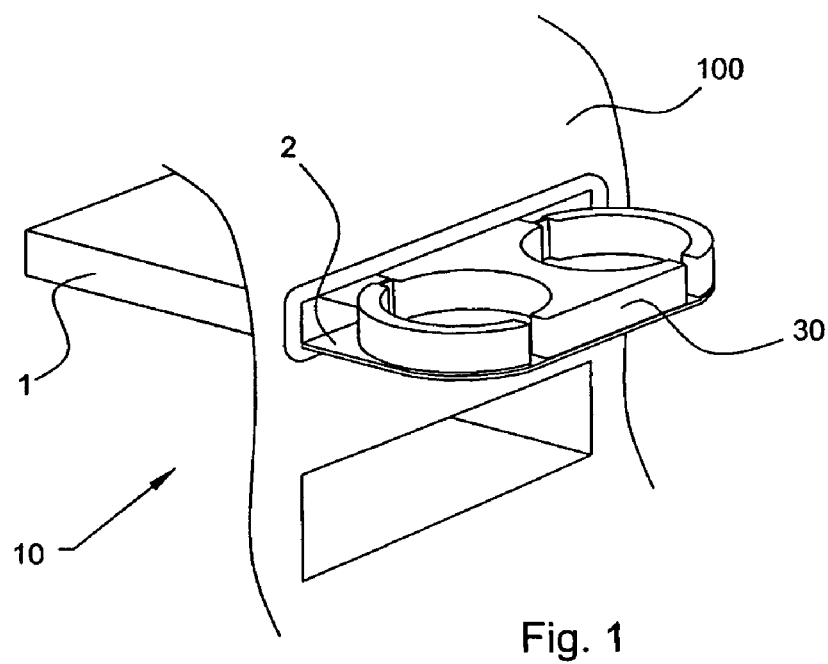
FIG. 1 shows a partial section perspective view of a preferred cup holder of the present invention mounted in a vehicle interior.

Reference will now be made to the drawings, wherein to the extent possible like reference numerals are utilized to designate like components throughout the various views. Referring to FIG. 1, there is presented an infinitely adjustable articulated arm cupholder assembly of the present invention 10 in the use position, mounted in a vehicle interior 100.

As further shown in FIG. 1 the infinitely adjustable articulated arm cupholder assembly of the present invention 10 comprises a cupholder housing 1, a cupholder tray 2 having an infinitely adjustable articulated arm unit 30 mounted thereon, said cupholder assembly 10 shown in the extended, open or use position. The cupholder housing 1 and cupholder try 2 may be made of any suitable material well known in the art. Presently preferred is polypropylene.

Figure 2:
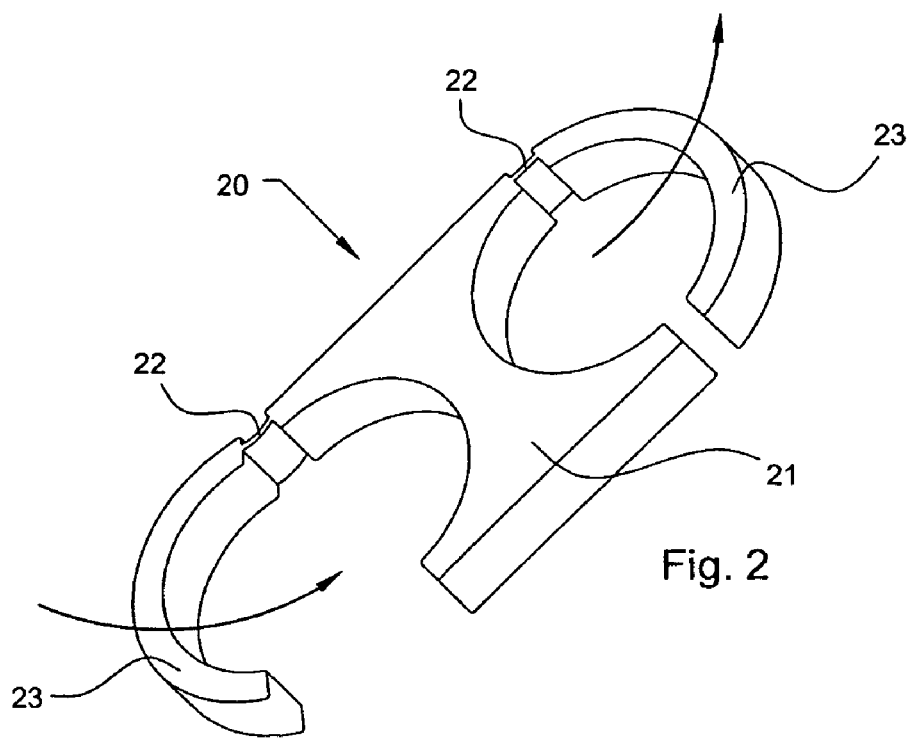
FIG. 2 shows a cup holder articulating arm unit core of the present before it is covered with thermoplastic elastomer.

Referring now to FIG. 2, there is shown the core 20 of the infinitely adjustable articulated arm unit 30 (FIG. 3) having a body 21, a pair of articulating arms 23, each of said articulating arms 23 having a distal end connected to body 21 by living hinge 22 and a proximal end unattached to body 21. FIG. 2 further shows one articulated arm 23 in a normally closed position and the other articulated arm 23 in an open position such as would be the case when a beverage container was being held. It is to be understood that the core 20 is preferably formed using known molding techniques and equipment for molding plastic components. Suitable plastic materials include, for example, general purpose polypropylenes, presently preferred is polypropylene.

Figure 3:
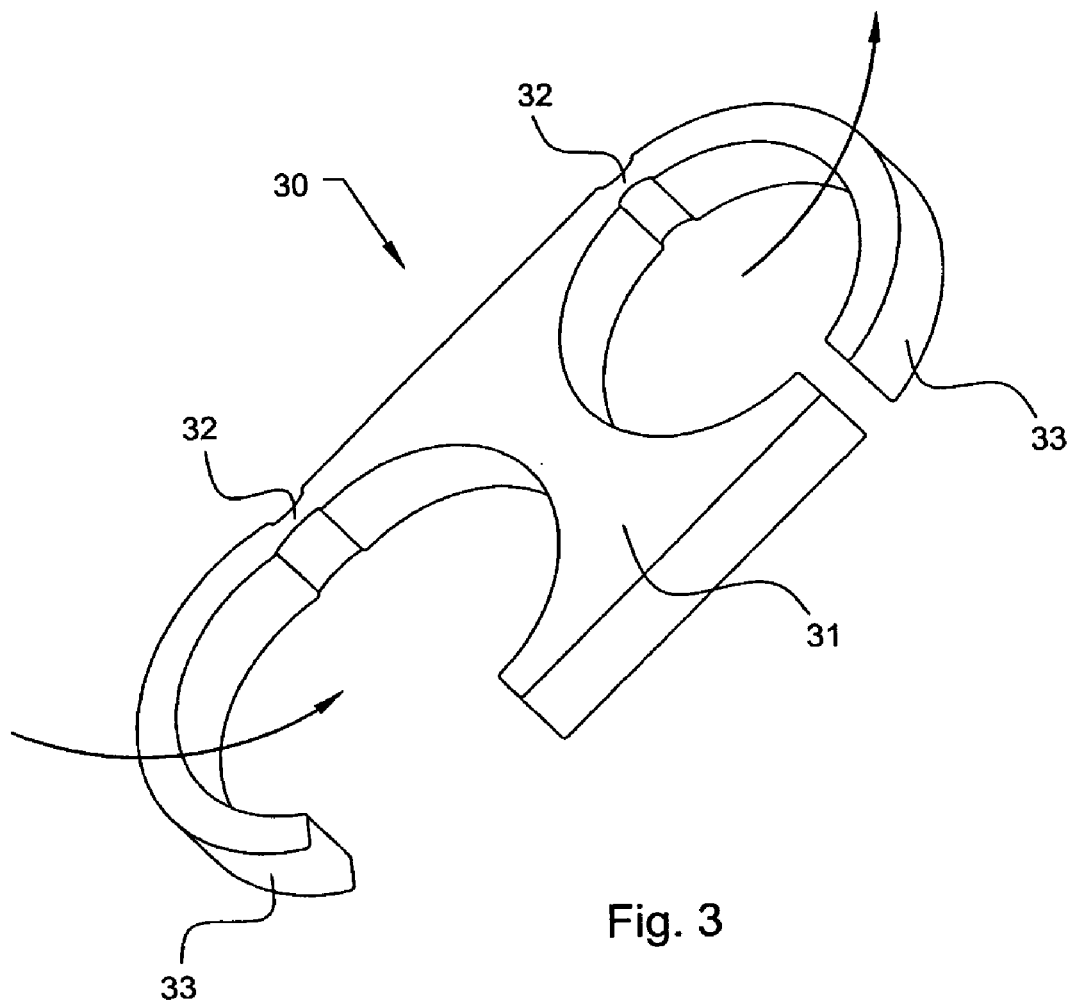
FIG. 3 shows a completed cup holder articulating arm unit after the unit core has been covered with a thermoplastic elastomer.

Turning now to FIG. 3, there is shown the finished infinitely adjustable articulated arm unit 30 having a thermoplastic elastomer (TPE) molded over the core 20 (FIG. 2). The body 21 (FIG. 2) covered by TPE shown as 31, the articulated arms 23 covered by TPE and shown as 33, and the living hinges 22 (FIG. 2) covered by TPE and shown as 32. It is to be understood that the TPE is applied simultaneously to the complete unit 30 in a single operation. Preferably by a over-molding process. Suitable TPEs are well known in the art. The presently preferred TPE is a thermoplastic elastomer manufactured by AES Corporation under the brand name Santoprene. Other suitable materials that may be used for this purpose include, for example, thermoplastic olefins and polyvinylchlorides.

Figure 4:
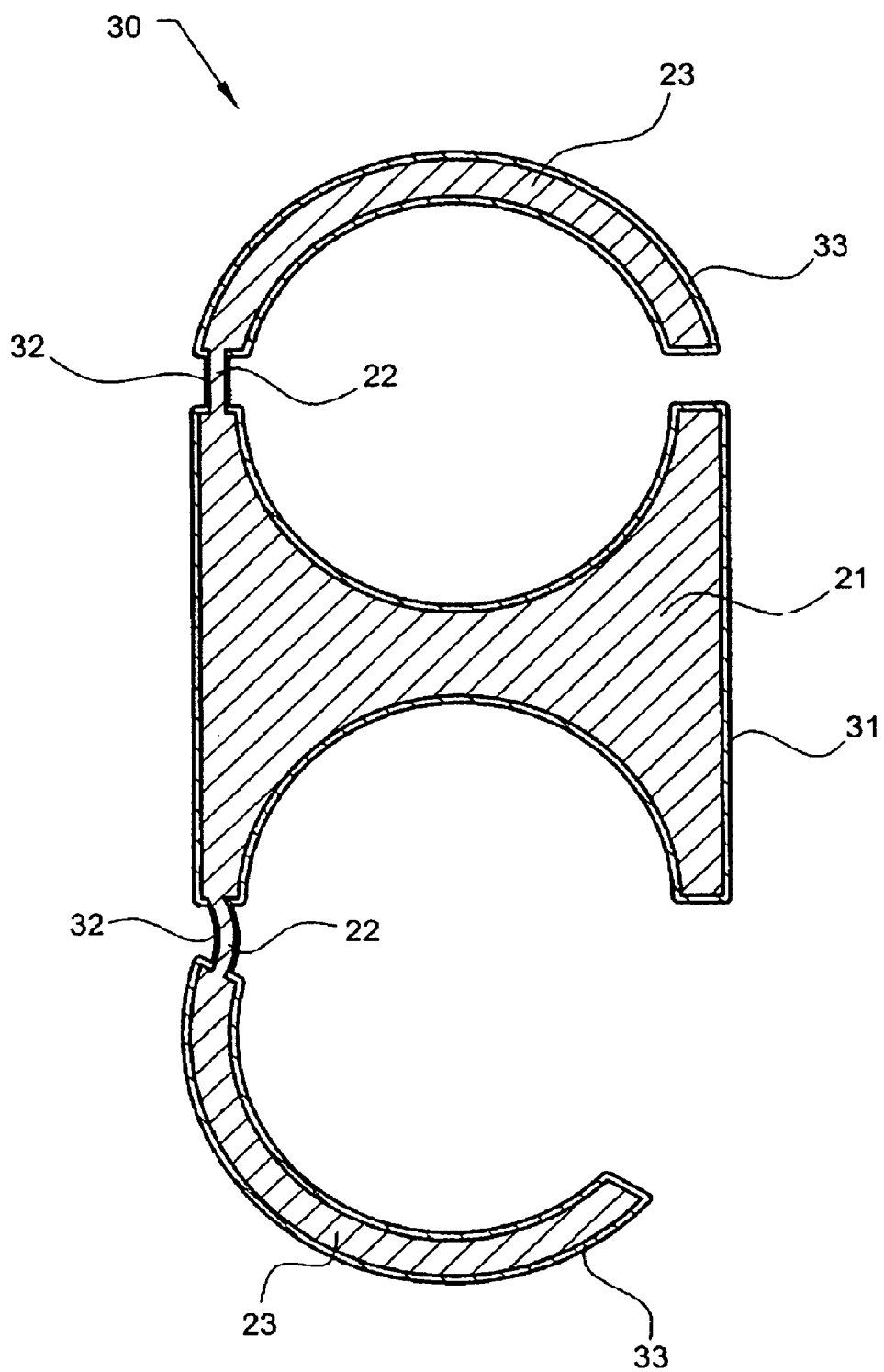
FIG. 4 shows a cross section of the completed cup holder articulating arm unit having a first plastic core and a second plastic over-molding.

Finally, FIG. 4 shows a cross section of the completed cup holder articulating arm unit 30 having a thermoplastic elastomer (TPE) molded over the core 20 (FIG. 2). The first plastic body 21, articulating arms 23, and living hinges 22 covered by a second plastic TPE identified as 31, 32, and 33 respectively.

In practice the infinitely adjustable articulating arm unit core 20 is molded with the articulated arms 23 in the closed position. The TPE is then molded over the core 20 to produce the finished unit 30 with the articulated arms 33 in a normally closed position. The properties of the TPE cause a return spring effect against the articulated arms when are rotated outward to accept a beverage container. This return spring effect causes the arms to pivot back to the normally closed position upon removal of the beverage container form the cupholder. Arrows in FIGS. 2 & 3 indicate how the articulated arms pivot on the living hinges. In the preferred manufacturing process the core 20 and the finished unit 30 are molded in two sequential stages in the same mold.

Although the preferred embodiments of the present invention has been disclosed, various changes and modifications may be made without departing from the scope of the invention as set forth in the appended claims.

What is claimed is:

1. A cupholder assembly adapted for use in a vehicle for supporting containers, the vehicle having a receiving aperture for receiving the cupholder assembly, the cupholder assembly comprising:
    a cupholder housing adapted for use in a vehicle and having an opening on one end adapted to accept;
    a cupholder tray adapted for slidable connection within said cupholder housing between storage and use positions; and
    a cupholder infinitely adjustable articulated arm unit adapted for permanent mounting on said cupholder tray, said cupholder infinitely adjustable articulated arm unit comprising;
        a body portion adapted for permanent mounting on said cupholder tray and further adapted to hold beverage containers,
        at least one articulating arm adapted to hold beverage containers and pivotal about and connected to said body portion by,
        a living hinge; and
    said cupholder infinitely adjustable articulated arm unit being molded of a first plastic composition having at least one living hinged articulating arm in a normally closed position covered by an over-molding of a second plastic of a different composition than said first plastic providing a spring closing action to said at least one living hinged articulating arm when it is pivoted out of said normally closed position.

2. The cupholder assembly as claimed in claim 1 wherein, said cupholder assembly housing and tray are composed of a plastic.

3. The cupholder assembly as claimed in claim 1 wherein, said cupholder assembly housing and tray are composed of an injection molded plastic.

4. The cupholder assembly as claimed in claim 3 wherein, said injection molded plastic is polypropylene.

5. The cupholder assembly as claimed in claim 1 wherein, said cupholder assembly infinitely adjustable articulating arm unit is injection molded of a polypropylene and having an over-molded covering of a compound selected from the group consisting essentially of thermoplastic elastomers (TPE), thermoplastic olefins (TPO), and polyvinyl chlorides (PVC).

6. The cupholder assembly as claimed in claim 5 wherein, said cupholder assembly infinitely adjustable articulating arm unit is over-molded with the TPE Santoprene.

7. A cupholder assembly adapted for use in a vehicle for supporting containers, the vehicle having a receiving aperture for receiving the cupholder assembly, the cupholder assembly comprising:
a cupholder housing adapted for use in a vehicle and having an opening on one end adapted to accept;
a cupholder tray adapted for slidable connection within said cupholder housing between storage and use positions; and
a cupholder infinitely adjustable articulated arm unit adapted for permanent mounting on said cupholder tray, said cupholder infinitely adjustable articulated arm unit comprising;
a body portion adapted for permanent mounting on said cupholder tray and further adapted to hold beverage containers,
two articulating arms each adapted to hold a beverage container and each pivotal about and connected to said body portion by,
a living hinge; and
said cupholder infinitely adjustable articulated arm unit being molded of a first plastic composition having two living hinged articulating arms in a normally closed position covered by an over-molding of a second plastic of a different composition than said first plastic providing a spring closing action to said two living hinged articulating arms when they are pivoted out of said normally closed position.

8. The cupholder assembly as claimed in claim 7 wherein, said cupholder assembly housing and tray are composed of a plastic.

9. The cupholder assembly as claimed in claim 7 wherein, said cupholder assembly housing and tray are composed of an injection molded plastic.

10. The cupholder assembly as claimed in claim 9 wherein, said injection molded plastic is polypropylene.

11. The cupholder assembly as claimed in claim 7 wherein, said cupholder assembly infinitely adjustable articulating arm unit is injection molded of a polypropylene and having an over-molded covering of a compound selected from the group consisting essentially of thermoplastic elastomers (TPE), thermoplastic olefins (TPO), and polyvinyl chlorides (PVC).

12. The cupholder assembly as claimed in claim 11 wherein, said cupholder assembly infinitely adjustable articulating arm unit is injection molded of a polypropylene and over-molded of a thermoplastic elastomer (TPE).

* * * * *